UNITED STATES PATENT OFFICE.

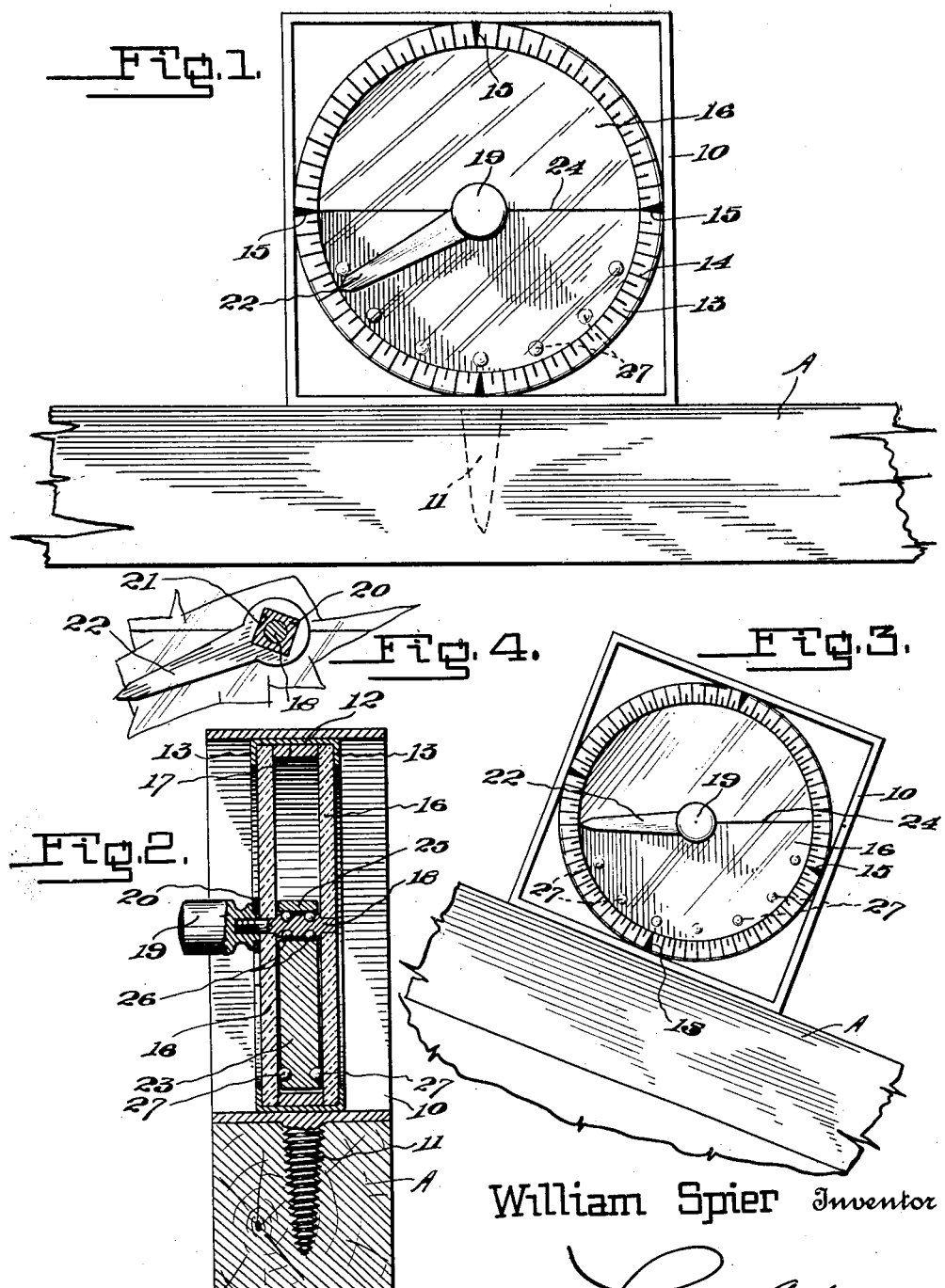

WILLIAM SPIER, OF CHICAGO, ILLINOIS.

MEASURING INSTRUMENT.

1,370,233.  Specification of Letters Patent.  Patented Mar. 1, 1921.

Application filed October 20, 1919. Serial No. 331,792.

*To all whom it may concern:*

Be it known that I, WILLIAM SPIER, a citizen of the United States, residing at Chicago, in the county of Cook and State of Illinois, have invented certain new and useful Improvements in Measuring Instruments, of which the following is a specification.

This invention relates to improvements in measuring instruments, and more particularly to a plumb and level indicator, designed for use by various types of mechanics, such as carpenters, masons, or the like, for use in plumbing or leveling any desired structure and also for permitting of the measuring of the degree of angle of inclination of an inclined surface.

Another object of this invention is to provide a combined plumb and level indicator which comprises a graduated dial and an indicating hand or pointer rotatable about the axis of the instrument or indicator and adapted to be positioned at various locations about said scale to indicate the measurements of various angles or the inclining of various objects, and which indicator further comprises a balance member suspended upon a suitable shaft extending axially through the indicator and adapted to be moved by gravitation, the upper edge of which is adapted to co-act with the scale, whereby the user may, by setting the indicator at a predetermined position upon the graduated scale curve the article to be measured until the measuring line of the balancing member coincides with the indicating point of the indicator or indicating finger and also by means of which the user may determine just how much out of plumb or vertical position the article is, permitting the eliminating of the use of plumb bobs commonly employed for this purpose with which a ruler must be applied to measure a distance out of plumb or the distance between a vertical line and the upper or lower edge of the upright article.

A further object of the invention is to provide a casing surrounding the graduated dial, said casing carrying a wood screw, the said screw being adapted to be embedded in a suitable block or strip of wood for attaching the indicator thereto, to adapt the indicator for various uses such as a level or analogous instrument.

Other objects of the invention will appear in the following detailed description taken in connection with the accompanying drawing forming a part of this specification, and in which drawing:

Figure 1 is a side elevation of the plumb and level indicator.

Fig. 2 is a vertical section through the indicator.

Fig. 3 is a side elevation of the indicator showing the use thereof in properly inclining a surface or article, and Fig. 4 is a detail sectional view through a part of the indicator showing the indicating pointer and the manner of mounting the same.

Referring more particularly to the drawings, wherein like characters indicate like and corresponding parts throughout the several views, the plumb and level indicator comprises a substantially rectangular casing 10 which has a wood screw 11 attached to one side thereof, the said wood screw being adapted to permit the attachment of the indicator to a strip of wood or analogous material, indicated at A to adapt the indicator for use as a level or for various other uses where it is desired to provide a relatively long engaging surface for the indicator.

A metal ring 12 is placed within the casing, 10 and is attached thereto in any suitable manner, the said ring having annular inturned flanges 13 at its edges. These flanges 13 are graduated, as clearly shown in Figs. 1 and 3 of the drawings, and these graduations may be made in any linear measure, or in any desired distance of measurement without departing from the spirit of this invention. However, in the present instance, the graduations 14 upon the inturned annular flanges 13 are made to represent one half inches, and inches, and the inturned flanges are provided with arrows 15 at diametrically opposite points, which are bisected by the horizontal and vertical diameters of the indicator.

A pair of spaced transparent disks 16 are mounted within the ring 12, and are held in spaced relation by a suitable spacing ring 17. These disks 16 are drilled at their centers to form bearings for the shaft 18, the outer end of which is threaded, and has a thumb knob 19 removably mounted thereon. The thumb knob 19 is provided with a rectangular portion 20 which engages in the rectangular openings 21, formed in the head of the indicator finger 22, to connect the indicating finger to the thumb knob 19 to permit rotation of the finger by rotation of the knob. In positioning the thumb knob 19 and indicator finger 22 upon the threaded end of the shaft 18, they are rotated upon the threaded end until the indicator finger 22 is in slight frictional contact with the disk 16. Upon further manual turning of the knob 19, the shaft 18 will move in unison therewith, due to the fact that the same rotatably bears in the disks 16; thus permitting the positioning of the indicating finger 22 to point to any graduation upon the flange 13.

A balance or gravitating member 23 is mounted upon the shaft 18 and this gravitating and balance member 23 is substantially semi-circular in shape, having its upper edge 24 positioned so that when the indicator is resting perfectly level in a horizontal plane, the upper edge will aline with the arrows 15 which are bisected by the horizontal axis of the graduated inturned flanges 13. The gravitating balance member 23 is enlarged, however, in its center to provide a bearing 25 in which bearing balls 26 are mounted, the said bearing balls being carried by suitable ball races formed in the enlarged portion of the shaft 18. A plurality of bearing balls 27 are carried by the gravitating balance member 23 near the periphery thereof and they are adapted to engage the inner surface of the transparent disk 16. These bearing balls 27 together with the bearing balls 26 are provided to decrease to a minimum friction during the swinging movement of the gravitating member 23, so as to permit free unimpeded swinging movement thereof, during adjustment of the indicator, so that the upper edge 24, co-acting with the graduation 14 will permit the user to measure various angles, will also facilitate the beveling of surfaces permitting the mechanic to determine when the desired beveling has been reached, together with various other uses.

Changes in details may be made without departing from the spirit of this invention, but;

I claim:

1. In a measuring instrument, the combination of a ring having inturned annular flanges on its edges, said flanges being provided with graduations supporting disks within said ring, a shaft extending axially through said disks, an indicator finger on said shaft and rotatable therewith and a gravitating indicator element mounted on said shaft for movement independently of said shaft, and between said disks, and bearing balls carried by the side faces of said gravitating indicator element, and engaging said disks.

2. In a measuring instrument, the combination of a ring having inturned annular flanges on its edges, said flanges being provided with graduations supporting disks within said ring, a shaft extending axially through said disks, an indicator finger on said shaft and rotatable therewith and a gravitating indicator element mounted on said shaft for movement independently of said shaft, and between said disks, and bearing balls carried by the side faces of said gravitating indicator element and engaging said disks, and a casing surrounding said ring and a lag screw carried by said casing.

3. In a measuring instrument, the combination of a casing, an attaching screw carried by said casing, a ring supported within said casing having inturned annular flanges thereon, said flanges being graduated, a manually movable indicating finger adapted to be moved to indicate a predetermined angle measurement, and a gravitating indicating element and means within said ring for supporting said indicating finger and said gravitating indicating element.

4. I a measuring instrument, the combination of a casing, an attaching screw carried by said casing, a ring within said casing having a graduated inturned annular flange thereon, a pair of spaced transparent disks within said ring, a shaft extending axially through said disks and supported thereby, an indicating finger on said shaft and adapted to be moved by rotation of the shaft, and a gravitating indicating element mounted on said shaft for movement independently of the shaft, said gravitating indicating element adapted to coöperate with said indicating finger to determine the precision in positioning of an object.

5. In a measuring instrument, the combination of a casing having graduations thereon, a shaft pivoted within said casing, an indicator finger adapted to be set in a position with respect to said graduations, and a gravity operated indicator movably mounted upon said shaft, said measuring instrument adapted to be placed upon an object for determining the precision of the positioning of said object by the relative position of said finger, with respect to said gravity operated indicator.

WILLIAM SPIER.